(12) United States Patent  
Jordan et al.

(10) Patent No.: US 8,368,664 B2
(45) Date of Patent: Feb. 5, 2013

(54) DEVICE FOR PROVIDING IMPROVED ACCESS TO THE FUNCTIONS OF HUMAN MACHINE INTERFACES

(75) Inventors: J. Bern Jordan, Madison, WI (US); Gregg C. Vanderheiden, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 13/347,039

(22) Filed: Jan. 10, 2012

(65) Prior Publication Data

US 2012/0107566 A1    May 3, 2012

Related U.S. Application Data

(63) Continuation of application No. 12/120,730, filed on May 15, 2008, now Pat. No. 8,115,741.

(51) Int. Cl.
*B32B 3/30* (2006.01)
(52) U.S. Cl. .................................................. 345/173

(58) Field of Classification Search .................. 345/173; 434/112–117; 361/600; 341/20–21
See application file for complete search history.

(56) References Cited

U.S. PATENT DOCUMENTS

| | | | | |
|---|---|---|---|---|
| 6,067,081 A * | 5/2000 | Hahlganss et al. | ............ | 345/173 |
| 6,384,743 B1 * | 5/2002 | Vanderheiden | ............ | 341/21 |
| 7,489,303 B1 * | 2/2009 | Pryor | ............ | 345/173 |
| 7,978,181 B2 * | 7/2011 | Westerman | ............ | 345/173 |
| 2006/0172266 A1 * | 8/2006 | Rogers et al. | ............ | 434/112 |
| 2007/0212668 A1 * | 9/2007 | Takami et al. | ............ | 434/113 |

* cited by examiner

*Primary Examiner* — Amare Mengistu
*Assistant Examiner* — Jennifer Zubajlo
(74) *Attorney, Agent, or Firm* — Boyle Fredrickson, S.C.

(57) ABSTRACT

A bezel positionable adjacent the outer periphery of a computer touch screen is provided. The bezel includes an elongated rim having a first side adjacent the computer screen and a surface. An identification marker positioned on the surface of the rim and identifying a predetermined area of the touch screen. A tactile indicium structure is on the surface at a location between the identification marker and the predetermined area of the touch screen. The tactile indicium structure includes an upper surface having tactile indicium thereon.

16 Claims, 2 Drawing Sheets

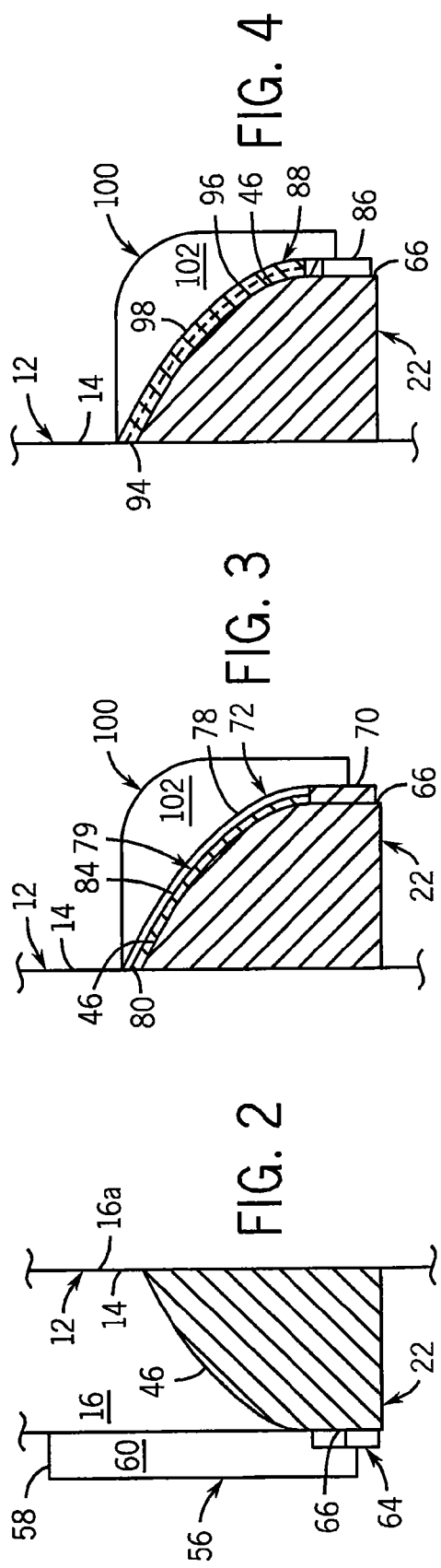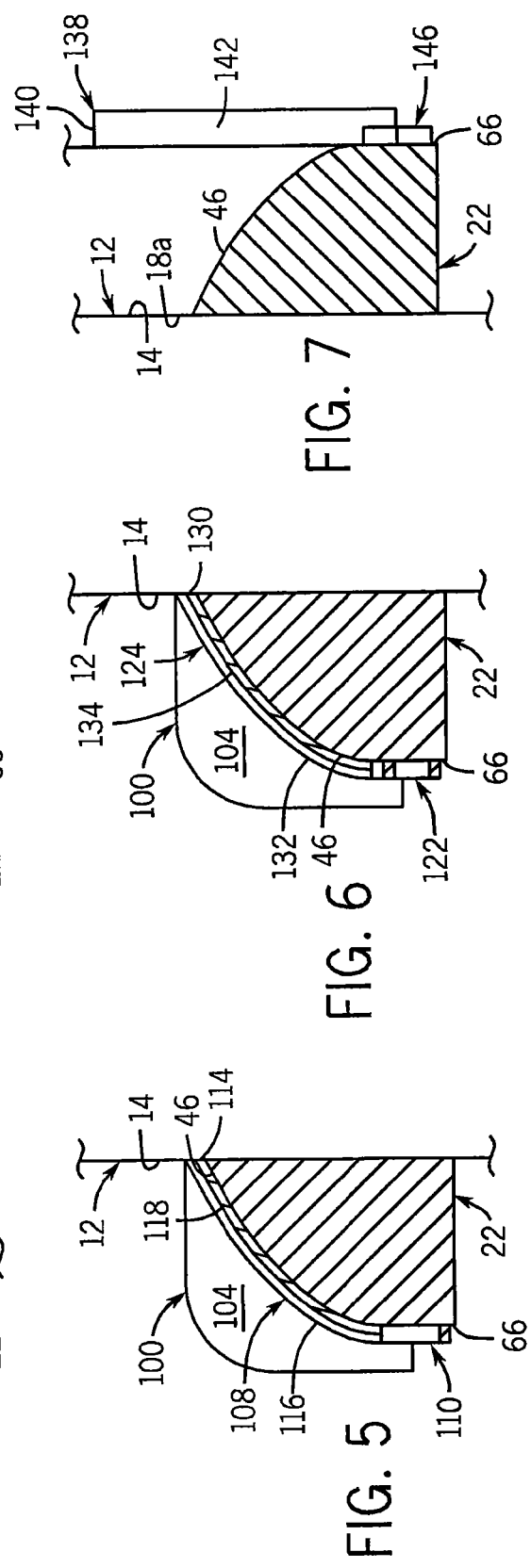

DEVICE FOR PROVIDING IMPROVED ACCESS TO THE FUNCTIONS OF HUMAN MACHINE INTERFACES

CROSS-REFERENCE TO RELATED APPLICATIONS

This application is a continuation of U.S. application Ser. No. 12/120,730, filed May 15, 2008 now U.S. Pat. No. 8,115,741, the entire contents of which is incorporated herein by reference.

REFERENCE TO GOVERNMENT GRANT

This invention was made with United States government support awarded by the following agency: H133E030012. The United States has certain rights in this invention.

FIELD OF THE INVENTION

The invention relates generally to human-machine interfaces (HMIs), and in particular, to a device for providing improved access to the functions of HMIs for people with disabilities without requiring the addition of physical buttons.

BACKGROUND AND SUMMARY OF THE INVENTION

The electronic touch screen is representative of current innovative HMIs for electronic devices. With a touch screen, the user enters data by touching virtual buttons displayed on the computer display. With a touch screen system, the type, size, and number of the virtual buttons may be readily changed by changing the computer's program without changes in the associated hardware. Thus, the touch screen system offers a user-interface that may be flexibly tailored to a particular application. The ability to divide virtual buttons among different screens and to display only those screens needed by the user's particular task can simplify data entry. The combination of text and graphical elements on the screen along with the virtual buttons can help to further guide the user through the steps of data input.

Normally, a touch screen system uses a touch screen panel which is placed directly over the viewing area of a standard computer display, for example, a cathode ray tube ("CRT") or a liquid crystal display ("LCD"). The touch screen panel provides a signal to a computer associated with the computer display indicating where on the surface of the display a stylus or finger is placed. This signal may be generated, for example, by acoustic systems detecting absorption of sound by a finger on the surface of the display; by systems using crossed beams of infrared light arrayed along x and y axes which are broken by the finger; or by laminated transparent electrodes which are physically compressed against each other to provide a point electrical contact that may be interpreted as an x and y coordinate.

Frequently, a touch screen will be used with a computer contained within a device to be used by the public. The computer may have so-called multi-media capabilities providing both a visual and audio program intended to help members of the public obtain information or directions.

Despite the advantage of touch screen systems in such applications, like many novel interface controls, they present a barrier to many people with disabilities. Those with impaired vision perceive only the featureless surface of the display screen knowing that it may contain one or more virtual buttons of arbitrary placement and functions. Those unfamiliar with the language of the legends on the buttons or those who cannot read, are also foreclosed from much of the information presented by touch screen systems. Critical audio information in multi-media presentations will not be received by deaf users. Those with limited mobility may be unable to reach or operate the touch screen surface.

Heretofore, incorporating accessibility into kiosks and other touch screen systems has typically involved adding buttons, keyboards or other mechanical controls for the systems. In many kiosk designs, the addition of these buttons, keyboards or other mechanical controls may be limited by a lack of space, expense or various other constraints. Hence, it would be desirable to provide a device for improving access to the functions of HMIs for people with disabilities without requiring the addition of physical buttons, keyboards or other mechanical controls.

Therefore, it is a primary object and feature of the present invention to provide a device for improving access to the functions of HMIs for people with disabilities without requiring the addition of physical buttons, keyboards or other mechanical controls.

It is a further object and feature of the present invention to provide a device for improving access to the functions of HMIs for people with disabilities that is simple to use and inexpensive to manufacture.

It is a still further object and feature of the present invention to provide a device for improving access to the functions of HMIs for people with disabilities that may be utilized without altering operation of the HMIs or the electronic devices controlled by the HMIs.

In accordance with the present invention, a bezel positionable adjacent the outer periphery of a computer touch screen is provided. The bezel includes an elongated rim having a first side adjacent the touch screen and a surface. An identification marker is positioned on the surface of the rim. The identification marker identifies a predetermined area of the touch screen corresponding to a virtual button. The rim includes a recess therein at location between the identification marker and the touch screen. The recess defines a tactile guide path from the identification marker to the virtual button.

The recess may have a semi-circular cross-section or a generally V-shaped cross-section. The identification marker may includes a generally V-shaped chevron. The chevron includes first and second ribs diverging from a point. Alternatively, the identification marker may have a generally circular configuration.

In accordance with a further aspect of the present invention, a bezel positionable adjacent the outer periphery of a computer touch screen is provided. The touch screen display displays a plurality of virtual buttons across a portion thereof. The bezel includes an elongated rim having a first side adjacent the touch screen and a surface. A plurality of identification markers extend from the rim. Each identification marker is alignable with a corresponding one of the plurality of virtual buttons. A plurality of tactile guides are provided along the surface of the rim. Each tactile guide is positioned between a corresponding one of the plurality of identification markers and a corresponding one of the plurality of virtual buttons.

At least one tactile guide is defined by a recess in the surface of the rim. The recess may have a semi-circular cross-section or a generally V-shaped cross-section. At least one of the plurality of identification markers includes a generally V-shaped chevron. The chevron is defined by first and second ribs diverging from a point. Alternatively, at least one of the plurality of identification markers has a generally circular configuration.

In accordance with a still further aspect of the present invention, a bezel positionable adjacent the outer periphery of a computer touch screen is provided. The touch screen display displays a plurality of virtual buttons across a portion thereof. The bezel includes an elongated rim having a first side adjacent the touch screen and a surface. A plurality of axially spaced identification markings are provided on the rim. Each identification marking is aligned with and identifies a corresponding one of the plurality of virtual buttons. A plurality of axially spaced tactile guides are provided along the surface of the rim. Each tactile guide is positioned between a corresponding one of the plurality of identification markers and a corresponding one of the plurality of virtual buttons.

At least one tactile guide is defined by a recess in the surface of the rim. The recess may have a semi-circular cross-section or a generally V-shaped cross-section. At least one of the plurality of identification markers includes a generally V-shaped chevron. The chevron is defined by first and second ribs diverging from a point. Alternatively, the at least one of the plurality of identification markers may have a generally circular configuration.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 2 is a cross-sectional view of the bezel of the present invention taken along line 2-2 of FIG. 1;

FIG. 3 is a cross-sectional view of the bezel of the present invention taken along line 3-3 of FIG. 1;

FIG. 4 is a cross-sectional view of the bezel of the present invention taken along line 4-4 of the FIG. 1;

FIG. 5 is a cross-sectional view of the bezel of the present invention taken along line 5-5 of FIG. 1;

FIG. 6 is a cross-sectional view of the bezel of the present invention taken along line 6-6 of FIG. 1; and FIG. 7 is a cross-sectional view of the bezel of the present invention taken along line 7-7 of FIG. 1.

DETAILED DESCRIPTION OF THE DRAWINGS

Figure 1:
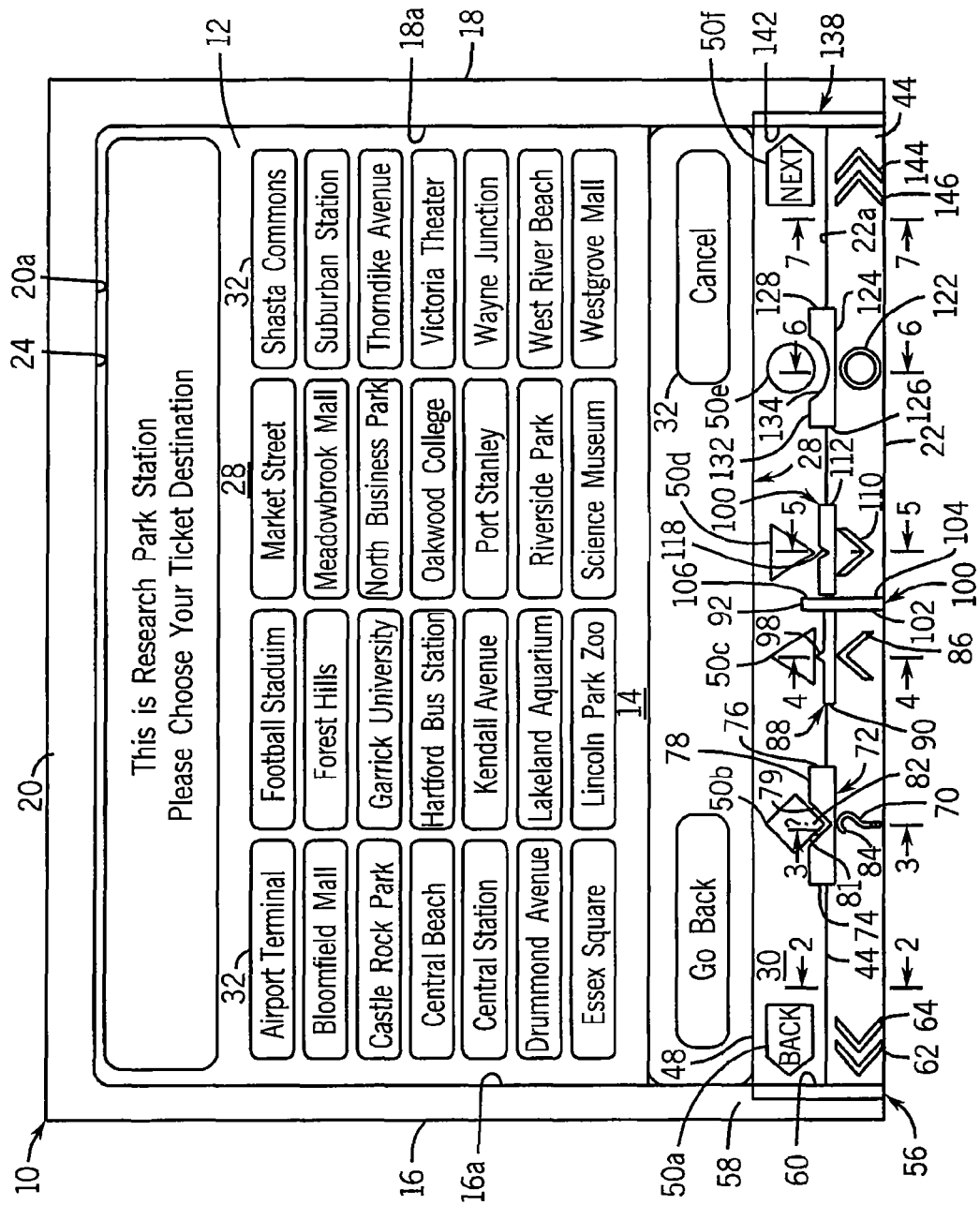
FIG. 1 is a front elevational view of a bezel in accordance with the present invention surrounding a standard computer touchscreen.

Referring to FIG. 1, a bezel in accordance with the present invention is generally designated by the reference numeral 10. It is intended for bezel 10 to surround a conventional computer touch screen generally designated by the reference numeral 12. Touch screen 12 is positioned in front of and in alignment with a standard computer display, for example, a cathode ray tube or a liquid crystal display. Touch screen 12 is well known in the art and may apply a number of different technologies, including those employing crossed beams of infrared light (which detect a finger or stylus by the interruption of one or more beams), and those employing layered transparent electrodes (which detect the finger or stylus by its deforming layers and causing the electrodes to touch). As is conventional, touch screen 12 includes an outer, display surface 14 on which the stylus or finger is placed, for reasons hereinafter described.

Bezel 10 is defined by first and second generally parallel side frame members 16 and 18 interconnected by upper and lower frame members 20 and 22, respectively. First and second side frame members 16 and 18, respectively, are generally parallel to each other and generally perpendicular to upper and lower frame members 20 and 22, respectfully. First and second side frame members, respectively, include corresponding inner edges 16a and 18a, respectively. Similarly, upper and lower frame members 20 and 22, respectively, include corresponding inner edges 20a and 22a, respectively. Inner edges 16a and 18a of first and second frame members 16 and 18, respectively, and inner edges 20a and 22a of upper and lower frame members 20 and 22, respectively, define a generally rectangular opening 24 therethrough. It is intended for bezel 10 to be positioned adjacent display surface 14 of touch screen 12 such that the computer display is visible through opening 24 defined by bezel 10.

Touch screen 12 and the computer display are operatively connected to a central processing unit (not shown). Touch screen 12 provides a user interface with the central processing unit that is flexibly tailored to a particular application operating in accordance with a computer program executed in the central processing unit. As is known, a touch screen provides a high-resolution X-Y coordinate signal to the central processing unit in response to the touching or "pressing" of the display surface of the touch screen, in a manner hereinafter described.

In the present invention, it is contemplated for the central processing unit to simultaneously generate first and second display areas 28 and 30, respectively, on the computer display. First display area 28 includes a plurality of virtual buttons 32 arranged on the surface of the computer display in accordance with a computer program executed by the central processing unit. It is contemplated for the computer program to provide a series of screens that may be displayed in first display area 28 in order to divide a user's interaction with touch screen 12 into discrete logical stages. In the depicted environment, each screen includes a plurality of virtual buttons 32 that are generally rectangular images containing an alpha and/or numeric label. Virtual buttons 32 may be "pressed" by a user by touching a portion of outer surface 14 of touch screen 12 that overlies a corresponding desired virtual button on the computer display thereby causing the central processing unit to execute a predetermined set of instructions associated with such virtual button. As understood in the art, each virtual button may include a "pressed" and "unpressed" image reflecting its two possible states. Typically, a shadow box surrounds the selected virtual button 32 and changes shade in response to the state thereof so as to mimic a real button being depressed or released.

Similar to first display area 28, second display area 30 includes a plurality of virtual buttons 50a-50f, as hereinafter described. Second display area 30 is defined by inner edges 16a and 18a of first and second side frame members 16 and 18, respectively, of bezel 10. Second display area 30 further includes a lower edge 44 adjacent upper edge 22a of lower frame member 22 of bezel 10 and an upper edge 48 vertically spaced therefrom. Virtual buttons 50a-50f are axially spaced between inner edge 16a of side frame member 16 and inner edge 18a of side frame member 18. It is contemplated for virtual buttons 50a-50f to allow a user who has difficulty reading the information in first display area 28 to control the screen and the selection of virtual buttons 32 displayed in first display area 28. By way of example, virtual button 50a allows a user to scroll backwards through the plurality of screens displayed in first display area 28. Depression of virtual button 50b actuates an audio cue that assists an individual with vision impairment or the individual who has difficulty reading the information displayed on first display area 28 to receive information on the capabilities of and the instructions for operation of virtual buttons 32 displayed in the first display area 28. Virtual button 50*c* has a generally triangular outline and allows the user to scroll through virtual buttons 32 displayed on first display area 28 in a first direction such that the pressing of virtual button 50*c* moves the shadow box from a first virtual button 32 to a second virtual button 32. Similarly, virtual button 50*d* having a generally triangular outline allows the user to scroll through virtual buttons 32 displayed in first display area 28 in a second, opposite direction. Virtual button 50*e* having a generally circular outline allows a user to select or "press" the virtual button 32 in first display area 28 surrounded by the shadow box. Depression of virtual button 50*f* allows a user to scroll to the next screen to be displayed in first display area 28.

In order to assist a user as to the location and identification of virtual buttons 50*a*-50*f*, various indicia are provided on lower frame member 22 of bezel 10. By way of example, a left hand stop member 56 projects from first side frame member 16 of bezel 10 and lies in a plane generally perpendicular to display surface 14 of touch screen 12. As best seen in FIGS. 1-2, left hand stop member 56 includes an upper edge 58 generally co-planer with upper edge 48 of second display area 30 and an inner face 60 lying in a parallel plane with inner edge 16*a* of first side frame member 16 of bezel 10. It is intended for left hand stop member 56 to define the left hand end of second display area 30 for a user. First and second chevrons 62 and 64, respectively, project from outer surface 66 of lower frame element 22 at a location directly below virtual button 50*a*. First and second chevrons 62 and 64, respectively, include corresponding vertices directed towards inner face 60 of left hand stop member 56. It is intended for first and second chevrons 62 and 64, respectively, to provide an identification marker that identifies the location and function of virtual button 50*a* thereabove to a user.

Referring to FIGS. 1 and 3, identification marker 70 has a question mark configuration and projects from outer surface 66 of lower frame member 22. Identification marker 70 is positioned below and aligned with virtual button 50*b*, and is intended to provide information to a user regarding the location and function of virtual button 50*b*. Tactile marker 72 projects from upper surface 46 of lower frame member 22 at a location between identification marker 70 and virtual button 50*b*. Tactile marker 72 is defined by first and second sides 74 and 76, respectively, interconnected by upper surface 78 and inner edge 80. Inner edge 80 is positioned adjacent display surface 14 of touch screen 12. A generally V-shaped trough 79 is provided in upper surface 78 of tactile marker 72 and is defined by first and second surfaces 81 and 82, respectively, converging at vertex 84. As best seen in FIG. 1, trough 79 partially surrounds the lower end of virtual button 50*b* and provides a guide path for an individual's finger from identification marker 70 to virtual button 50*b*. First and second sides 74 and 76, respectively, of identification marker 72 define a predetermined width on second display area 30 of touch screen 12 wherein the pressing of touch screen 12 by an individual will execute the predetermined set of instructions associated with virtual button 50*b*.

Referring to FIGS. 1 and 4, outer surface 66 of lower frame member 22 further includes an upwardly directed chevron 86 having a vertex directed toward second display area of touch screen 12. Chevron 86 is positioned below and in alignment with virtual button 50*c*. It is intended for chevron 86 to identify the location and function of virtual button 50*c*. Tactile marker 88 projects from upper surface 46 of lower frame member 22 at a location between chevron 86 and virtual button 50*c*. Tactile marker 88 includes first and second sides 90 and 92, respectfully, and a rear edge 94 abutting display surface 14 of touch screen 12. Tactile marker 88 further includes an upper surface 96 having a generally triangular rib 98 projecting vertically therefrom. As best seen in FIG. 1, rib 98 is positioned equidistant from and lies in a plane parallel to first and second sides 90 and 92, respectively, of tactile marker 88. It is intended for rib 98 to provide a tactile guide directing a user from chevron 86 to virtual button 50*c*. First and second sides 90 and 92, respectively, of tactile marker 88 define the width of a predetermined area wherein depression of touch screen 12 will actuate virtual button 50*c*.

Orientation member 100 projects from lower frame member 22 of bezel 10 at the midpoint thereof. Orientation member 100 includes first and second opposite sides 102 and 104, respectively, and lies in a plane generally perpendicular to touch screen 12. First side 102 lies in a common plane with second side 92 of tactile marker 88. Second side 104 of orientation member 100 lies in a common plane with first side 106 of tactile marker 108, hereinafter described. Orientation member 100 is intended to orientate the finger of a user along lower frame member 22 of bezel 10. In addition, orientation member 100 separates tactile marker 88 from tactile marker 108, hereinafter described.

Referring to FIGS. 1 and 5, bezel 10 further includes a downwardly directed chevron 110 projecting from outer surface 66 of lower frame member 22. Chevron 110 is positioned below and in axial alignment with virtual button 50*d*. It is intended for downwardly directed chevron 110 to identify the location and function of virtual button 50*d*. Tactile marker 108 projects vertically from upper surface 46 of the lower frame member 22 at a location between downwardly directed chevron 110 and virtual button 50*d*. Tactile marker 108 includes a second side 112 and a rearward edge 114 positionable adjacent display surface 14 of touch screen 12. Tactile marker 108 further includes an upper surface 116 extending between first and second sides 106 and 112, respectively, thereof. A generally V-shaped groove 118 is provided in upper surface 116 of tactile marker 108. Groove 118 is equidistant from first and second sides 106 and 112, respectively, of tactile marker 108 and lies in a plane that is generally parallel thereto. It is intended for groove 118 to provide a tactile guide for a user from downwardly directed chevron 110 to virtual button 50*d*. First and second sides 106 and 112, respectively, of tactile marker 108 further define a width of a predetermined area of second display screen 12 that a user may depress in order to actuate virtual button 50*d*.

Referring to FIGS. 1 and 6, bezel 10 further includes a generally ring-shaped identification marker 122 projecting from outer surface 66 of lower frame member 22. Identification marker 122 is aligned with and positioned below virtual button 50*e*. It is intended for identification marker 122 to identity the location and function of virtual button 50*e*. Tactile marker 124 projects upwardly from upper surface 46 of lower frame member 22. Tactile marker 124 includes first and second sides 126 and 128, respectively, and a rear edge 130 adjacent display surface 14 of touch screen 12. First and second sides 126 and 128, respectively, of tactile marker 124 lie in corresponding planes that are generally parallel to each other and perpendicular to touch screen 12. Upper surface 132 interconnects first and second sides 126 and 128, respectively, of tactile marker 124 and includes a semi-cylindrical recess 134 therein that partially surrounds virtual button 50*e*. It is intended for semi-cylindrical recess 134 and upper surface 132 of tactile marking 124 to provide a tactile guide path for the finger of a user from identification marker 124 to virtual button 50*e*. First and second sides 126 and 128, respectively, of tactile marker 124 define a width of a predetermined area of touch screen 12 that a user may depress in order to actuate virtual button 50*e*.

Referring to FIGS. 1 and 7, right hand stop member 138 projects from second side frame member 18 of bezel 10 and lies in a plane generally perpendicular to display surface 14 of touch screen 12. Right hand stop member 138 includes an upper edge 140 generally co-planer with upper edge 48 of second display area 30 and an inner face 142 lying in a parallel plane with inner edge 18a of second side frame member 18 of bezel 10. It is intended for right hand stop member 138 to define the right hand end of second display area 30 for a user. First and second chevrons 144 and 146, respectively, project from outer surface 66 of lower frame element 22 at a location directly below virtual button 50f. First and second chevrons 144 and 146, respectively, include corresponding vertices directed towards inner face 142 of right hand stop member 138. It is intended for first and second chevrons 144 and 146 respectively, to provide an identification marker that identifies the location and function of virtual button 50f thereabove to a user.

It can be appreciated that the second display area 30 may be adjacent first and second frame members 16 and 18, respectively, or along upper frame member 20 without deviating from the scope of the present invention. As a result, bezel 10 may be modified accordingly. Further, it can be appreciated that the cross-sectional shape of bezel 10 may be altered, as well as, the shapes and spacing of tactile markers, identification markers and chevrons may be modified without deviating from the scope of the present invention. It is also noted that identification marker 70, chevrons 86 and 110, and identification marker 122 may be positioned on upper surface 46 of lower frame member 22 adjacent outer surface of lower frame member 22. This alternate placement may, in turn, facilitate use of identification marker 70, chevrons 86 and 110, and identification marker 122 by a user of touch screen 12.

As described, the present invention allows for the accessible use of touch screen 12 by people with disabilities without adding tactile buttons or other mechanical controls. Access to all of the functionality of touch screen 12 is accomplished by providing a reserved area of touch screen 12, e.g. second display area 30, with dedicated virtual buttons for navigation and help. Users with low vision and blindness can use touch screen 12 by virtue of the combination of visible on-screen virtual buttons and tactile markers and features that protrude over the touch screen to indicate location of the virtual buttons for those who are blind. Audio output is available to read onscreen text and labels to users who require it. For people in a wheelchair or those with shorter stature, the controls along lower frame member 22 of bezel 10 across the bottom of touch screen 12 can be made within the reach standards of the Americans with Disabilities Act Accessibility Guidelines.

Various modes of carrying out the invention are contemplated as being within the scope of the following claims particularly pointing out and distinctly claiming the subject matter, which is regarded as the invention.

We claim:

1. A bezel positionable adjacent the outer periphery of a computer touch screen, the touch screen displaying a virtual button having a width, the bezel comprising:
    an elongated rim having a first side adjacent the touch screen and a surface; and
    an identification marker on the surface of the rim, the identification marker identifying a predetermined area of the touch screen corresponding to the virtual button;
    a tactile guide on the surface of the rim at a location between the identification marker and the virtual button, the tactile guide having a width greater than the virtual button and including a recess extending axially therein from a location adjacent the identification marker to a location adjacent the virtual button;

wherein the recess has a width less than with of the tactile guide and defines a tactile guide path from the identification marker to the virtual button.

2. The bezel of claim 1 wherein the recess has a semicircular cross-section.

3. The bezel of claim 1 wherein the recess has a generally V-shaped cross-section.

4. The bezel of claim 1 wherein the identification marker has a generally circular configuration.

5. A bezel positionable adjacent the outer periphery of a computer touch screen, the touch screen display displaying a plurality of virtual buttons across a portion thereof, comprising:
    an elongated rim having a first side adjacent the touch screen and a surface;
    a plurality of identification markers extending from and spaced along the rim, each identification marker alignable a corresponding one of the plurality of virtual buttons; and
    a plurality of tactile guides axially spaced along the surface of the rim, each tactile guide aligned with and positioned between a corresponding one of the plurality of identification markers and a corresponding one of the plurality of virtual buttons.

6. The bezel of claim 5 wherein at least one tactile guide is defined by a recess in the surface of the rim.

7. The bezel of claim 6 wherein the recess has a semicircular cross-section.

8. The bezel of claim 6 wherein the recess has a generally V-shaped cross-section.

9. The bezel of claim 5 wherein at least one of the plurality of identification markers includes a generally V-shaped chevron, the chevron defined by first and second ribs diverging from a point.

10. The bezel of claim 5 wherein at least one of the plurality of identification markers has a generally circular configuration.

11. The bezel of claim 10 wherein at least one of the plurality of identification markings includes a generally V-shaped chevron, the chevron defined by first and second ribs diverging from a point.

12. The bezel of claim 10 wherein at least one of the plurality of identification markings has a generally circular configuration.

13. A bezel positionable adjacent the outer periphery of a computer touch screen, the touch screen display displaying a plurality of virtual buttons across a portion thereof, comprising:
    an elongated rim having a first side adjacent the touch screen and a surface;
    a plurality of axially spaced identification markings on the rim, each identification marking aligned with and identifying a corresponding one of the plurality of virtual buttons; and
    a plurality of axially spaced tactile guides spaced along the surface of the rim, each tactile guide aligned with and positioned between a corresponding one of the plurality of identification markings and a corresponding one of the plurality of virtual buttons.

14. The bezel of claim 13 wherein at least one tactile guide is defined by a recess in the surface of the rim.

15. The bezel of claim 14 wherein the recess has a semicircular cross-section.

16. The bezel of claim 14 wherein the recess has a generally V-shaped cross-section.

* * * * *